Nov. 1, 1966   W. J. CAPUTI, JR   3,283,080
SWEEP-HETERODYNE APPARATUS FOR CHANGING THE
TIME-BANDWIDTH PRODUCT OF A SIGNAL
Filed July 6, 1962   5 Sheets-Sheet 1

INVENTOR
William J. Caputi, Jr.
BY
ATTORNEYS

INVENTOR
William J. Caputi, Jr.
BY
ATTORNEYS

INVENTOR
William J. Caputi, Jr.
BY
ATTORNEYS

INVENTOR
William J. Caputi, Jr.

Nov. 1, 1966  W. J. CAPUTI, JR  3,283,080
SWEEP-HETERODYNE APPARATUS FOR CHANGING THE
TIME-BANDWIDTH PRODUCT OF A SIGNAL
Filed July 6, 1962  5 Sheets-Sheet 5

INVENTOR
William J. Caputi, Jr.
BY
ATTORNEYS

United States Patent Office 3,283,080
Patented Nov. 1, 1966

3,283,080
SWEEP-HETERODYNE APPARATUS FOR CHANGING THE TIME-BANDWIDTH PRODUCT OF A SIGNAL
William J. Caputi, Jr., East Northport, N.Y., assignor to Cutler-Hammer, Inc., Milwaukee, Wis., a corporation of Delaware
Filed July 6, 1962, Ser. No. 208,070
19 Claims. (Cl. 179—15.55)

This invention relates to signal translation apparatus for manipulating signals with respect to time and bandwidth. It is particularly directed to the time expansion of signals, with accompanying reduction of bandwith. However, it is also possible to compress signals with accompanying increase in bandwidth, and to reverse portions of a signal with respect to time.

In general, the amount of information that can be transmitted through a channel is proportional to the time available for transmission and to the frequency bandwidth of the channel. The wider the bandwidth, the shorter the time required, and vice versa. In many instances, the duration and bandwidth of information are determined by the manner in which it is generated. Accordingly, if the information is to be processed in subsequent circuits, or transmitted to a remote point, etc., the channels must have an adequate bandwidth to transmit all the frequency components of the signal if the time duration remains unchanged.

It is frequently desirable to be able to change the time-bandwidth nature of a signal. It has heretofore been proposed to accomplish this by first recording the signal, as on a magnetic tape, etc., moving at a given speed. Then, by using a different speed of the recording medium during pickup, the time-bandwidth relationship can be changed. Thus, with a transmission channel of sufficiently wide band, the tape speed can be increased so that the information is transmitted in a shorter time. Or, if the channel bandwidth is narrower, the tape speed can be reduced.

The present invention provides means for accomplishing a similar result without requiring recording, and hence is free of many of the limitations present in recording systems.

In accordance with the present invention means are provided for dispersing a signal to expand the frequency components thereof as a function of time. A frequency sweep is also produced having a frequency-time variation different from the frequency-time dispersion of the input signal. The dispersed signal and the frequency sweep are supplied to mixer means to produce resultant sum or difference signals, and the resultant dispersed signal from the mixer means is supplied to a compression dispersive means to produce an output signal. By properly relating the frequency sweep to the dispersion of the input signal, and selecting the sum or difference output of the mixer, it is possible to obtain either time expansion or time compression. Further, if these relationships are properly chosen, it is possible to reverse portions of the signal with respect to time.

With proper design, essentially linear operation is possible, with low distortion and little signal attenuation. Also, the components employed may be of the passive type. While the invention will be specifically described in connection with electrical embodiments, it is also applicable to other fields, such as the optical and acoustic fields.

The invention will be more fully understood from the following discussion of specific embodiments thereof, wherein additional features will in part be pointed out and in part be understood by those skilled in the art.

Figure 1:
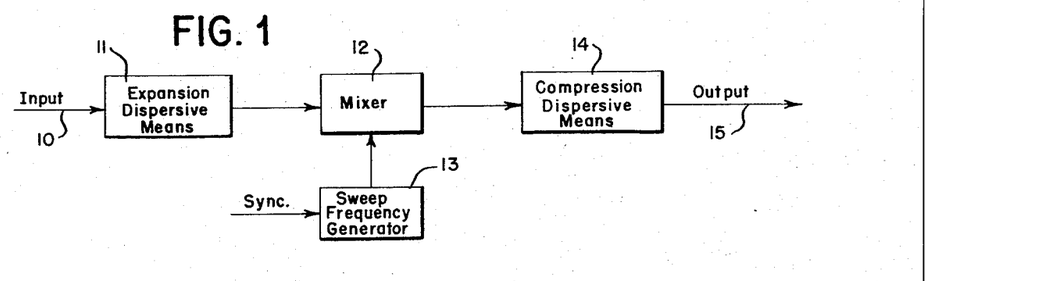
FIG. 1 is a block diagram of one embodiment of the invention.

Referring to FIG. 1, an input signal in line 10 is supplied to an expansion dispersive means 11 which disperses the frequency components of the signal as a function of time. The bandwidth of 11 is selected to accommodate the frequency band of the input signals to be applied thereto. The dispersed signal is supplied to mixer 12 along with a frequency sweep from generator 13. In the mixer 12, sum and/or difference frequency signals are produced and one or the other of these signals is supplied to an output compression dispersive means 14. The dispersed signal output of mixer 12 is compressed in 14 and yields an output signal in line 15.

Depending upon the selection of parameters, the output signal in line 15 can be a time expansion of the input signal in line 10, or a time compression thereof, or portions of the input signal can be reversed in time with or without expansion or compression. Appropriate relationships between parameters will be discussed below in connection with specific examples.

Figure 2:
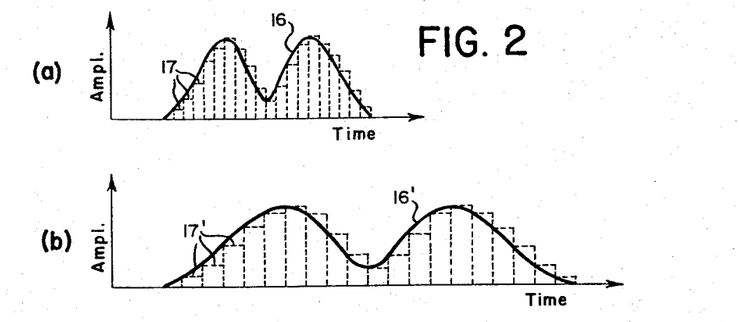
FIGS. 2(a) and 2(b) illustrate the time expansion of a signal.

FIG. 2(a) illustrates a signal 16 which is shown time expanded at 16' in FIG. 2(b). The signal can be considered to be two spaced rectangular pulses after passage through a transmission channel of somewhat restricted bandwidth which rounds off the pulses and causes them to overlap somewhat. Or, in general, the signal can be considered to be of arbitrary shape.

For convenience and clarity of explanation, the operation of FIG. 1 with various choices of parameters will be described for pulse inputs. Many applications of the invention may involve pulse-type inputs, and the descriptions will be directly applicable. However, in accordance with the sampling theorem well known in the communication field, continuous signals can be considered to be composed of pulses of elementary width and of height varying with the signal amplitude. Thus signal 16 may be considered to be composed of elementary pulses 17. The expanded signal 16' may likewise be considered as composed of expanded elementary pulses 17'. The width of the elementary pulses will depend on the bandwidth of the circuits through which the signal passes. Wider bandwidths yield narrower elementary pulses, and vice versa.

Accordingly, explanations of operation for pulse inputs suffice to explain the operation for other types of signals also.

FIG. 3(a) shows representative characteristics of a dispersive medium or device. In general, a dispersive medium or device functions to introduce different time delays for different frequencies passing therethrough. That is, frequencies are progressively delayed as a function of time. Thus, line 21 is a frequency-time characteristic in which the delay time is directly proportional to frequency. As indicated, the highest frequency 22 within the bandwidth 23 is delayed more than the lowest frequency 24 within that bandwidth. The difference in delay time between the highest and lowest frequencies is indicated at 25, and may be called the delay dispersion. It is also possible to arrange the dispersive device to delay low frequenices more than high, as shown by the dotted characteristic 26.

Such a dispersion characteristic can be obtained in various manners. For example, a delay line may be tapped at a number of successive points to provide successively longer delays, and narrow band filters having different adjacent passbands connected to the taps with their outputs connected to a common output line, as described in U.S. Patent 2,882,395 to White. Depending on the order of connecting the filters to the taps, low frequencies may be delayed more than high in the output line, or vice versa. Or, tuned filters of the inductance-capacitance type operated in the cutoff region thereof may be used to give dispersion over a limited frequency range. A waveguide operated near cutoff functions as a dispersive device and can be designed to give a linear dispersion. These and other dispersive devices can be employed depending on the frequency of operation, required bandwidth and dispersion, etc.

FIGS. 3(b), (c), (d) and (e) illustrate the functioning of dispersive devices for certain types of inputs signals. In FIG. 3(b) the dispersive device 27 is assumed to have a rising characteristic 21 like that shown in FIG. 3(a). If a pulse 28 is applied to the input, the frequency components of the pulse will be dispersed as a function of time, yielding an expanded output signal as shown at 29. On the other hand, if an input signal having a falling frequency-time variation as shown at 31 in FIG. 3(c) is applied to the same device 27, an output pulse 32 will be obtained. This is readily understood by recognizing that the highest frequency in the input signal 31 occurs ahead of the lowest frequency, whereas the dispersive device 27 delays the highest frequency more than the lowest. Thus, if the frequency-time characteristic of the dispersive device is matched to the frequency-time variation of the input signal, all components of the input signal will issue from the dispersive device at approximately the same time, yielding pulse 32.

FIG. 3(d) shows a dispersive device 33 having a falling frequency-time characteristic 26, like that shown in FIG. 3(a). If a pulse 28 is applied to such a device, the output signal 29' will be an expanded signal similar to 29 in FIG. 3(b), but the frequency-variation is in the opposite direction with respect to time. Thus, in FIGS. 3(b) and (d) the dispersive devices 27 and 33 function as expansion dispersive devices and yield output signal in which the frequency components of the input signal are expanded with respect to time.

In FIG. 3(e) an input signal 31' of positive slope is applied to the dispersive device 33 and, due to the negative slope of characteristic 26, a pulse 32 will be produced. This is similar to the operation shown in FIG. 3(c). In both cases the dispersive devices function as compression devices.

Some dispersive devices are capable of passing signals in either direction, and yield characteristics 21 or 26 depending on the direction of transmission. Others are for transmission in only one direction, and the slope of the characteristic depends on the detailed design.

Figure 4:
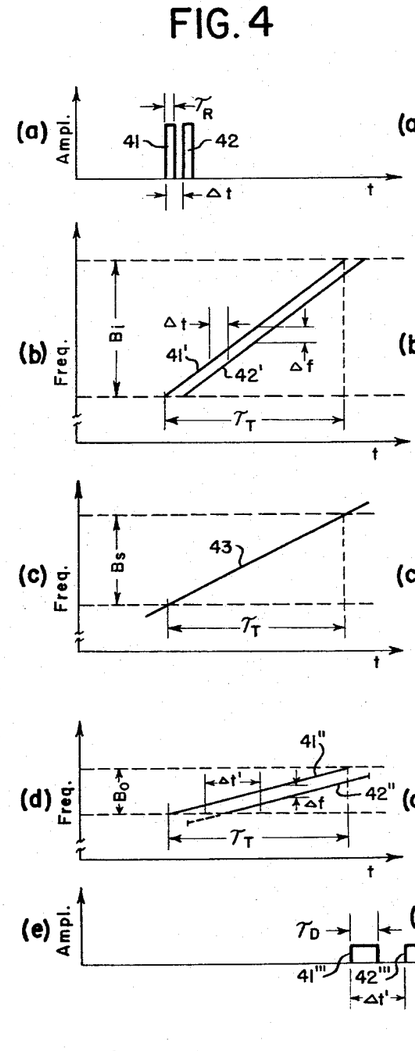
FIGS. 4(a) through 4(e) and 5(a) through 5(e) illustrate the operation of the circuit of FIG. 1 for time expansion.

Referring now to FIG. 4, FIG. 4(a) shows two pulses 41, 42 which are assumed to be applied to input line 10 of FIG. 1. The width of the pulses is designated $\tau_R$.

Considering first only pulse 41, in passing through the expansion dispersive means 11, the frequency components of this pulse are spread out in time as shown at 41' in FIG. 4(b). Here the bandwidth of the dispersive means 11 is denoted $B_i$ and the delay dispersion is designated $\tau_T$. The operation of dispersive means 11 is like that shown in FIG. 3(b).

In a practical design, a dispersive device may introduce an overall delay of all frequencies applied thereto, in addition to the delay dispersion. Such overall delays will be disregarded herein to simplify explanation, since the effect thereof will be readily understood by those skilled in the art and can be taken into account in a given application as required.

FIG. 4(c) shows a frequency sweep 43 produced by sweep frequency generator 13. The sweep slope is such that a bandwidth $B_s$ is covered in the time $\tau_T$. As shown, the slope of frequency sweep 43 is less than the slope of the frequency-time characteristic of the dispersive means 11, and hence less than the slope of the dispersed signal 41'.

The signals shown in FIGS. 4(b) and (c) are supplied to mixer 12 and it is here assumed that the difference output of the mixer is utilized. Accordingly, the output of the mixer will be a dispersed signal as shown at 41" in FIG. 4(d), this being the frequency difference between 41' and 43. Since frequency sweep 43 is in the same direction but has a smaller slope than 41', the difference dispersed signal 41" has a smaller slope than signal 41'.

The output compression dispersive means 14 is supplied with dispersed signal 41" and functions in the manner illustrated in FIG. 3(e) to produce an output pulse 41'''. The bandwidth of the output dispersive means 14 is designated $B_o$, and is shown equal to the frequency range of dispersed signal 41". Inasmuch as the frequency range of signal 41" is less than the frequency range of the dispersed input signal 41', output pulse 41''' will be longer than the corresponding input pulse 41. The approximate relationship can be developed mathematically as follows:

Assume that the bandwidth $B_i$ of the input dispersive means 11 is $1/\tau_R$. This relationship of bandwidth and pulse width is commonly employed in the art for reasonably faithful pulse reproduction. For convenience, the excursion $B_s$ of frequency sweep 43 may be denoted $1/\tau_R - 1/\tau_D$. Accordingly, by subtraction, the frequency excursion of 41" is $1/\tau_D$. With $B_o$ equal to this frequency excursion, the duration of the output pulse 41''' is approximately $\tau_D$. The closer the slope of sweep 43 approaches the slope of the dispersive characteristic of expansion dispersive means 11, the smaller the quantity $1/\tau_D$ will become. This corresponds to a larger $\tau_D$, and consequently a longer output pulse 41''' for a given input pulse 41.

Considering now the second input pulse 42, this is assumed to be spaced from pulse 41 by $\Delta t$. The corresponding dispersed signal 42' will be displaced from 41' by the same interval $\Delta t$, as shown in FIG. 4(b). At any given instant, the frequency difference between the two dispersed signals will be $\Delta f$, as shown. When mixed with sweep 43 in mixer 12, the corresponding difference dispersed signal 42" will be produced.

At any given instant in time, the frequencies of signals 41" and 42" will differ by the same amount $\Delta f$, as in FIG. 4(b). However, inasmuch as the slope of signals 41" and 42" is less than the slope of 41', 42' corresponding frequencies in signals 41", 42" will be separated by an amount $\Delta t'$ which is greater than $\Delta f$. Accordingly, output pulse 42''' will be spaced from output pulse 41''' by the amount $\Delta t'$, as shown in FIG. 4(e).

The relationship between the change in width and separation of the output pulses with respect to the input pulses can be shown as follows:

By similar triangles in FIG. 4(b):

$$\frac{\Delta f}{\Delta t} = \frac{B_i}{\tau_T} \qquad (1)$$

Since $B_i = 1/\tau_R$:

$$\Delta f = \frac{\Delta t}{\tau_T \tau_R} \qquad (2)$$

By similar triangles in FIG. 4(d):

$$\frac{\Delta f}{\Delta t'} = \frac{B_0}{\tau_T} \qquad (3)$$

Since $B_0 = 1/\tau_D$:

$$\Delta f = \frac{\Delta t'}{\tau_T \tau_D} \qquad (4)$$

By equating (2) and (4), and reducing:

$$\frac{\Delta t'}{\Delta t} = \frac{\tau_D}{\tau_R} \qquad (5)$$

Equation 5 shows that the ratio of output to input pulse spacing is equal to the ratio of output to input pulse width. Hence, both pulse width and pulse spacing change by like amounts. Accordingly, the signal in output line 15 will be a replica of the signal in input line 10, but linearly expanded with respect to time.

The amount of expansion can be determined by proper selection of the slope of the frequency sweep 43 with respect to the slope of the dispersive characteristic of 11, the latter being the same as shown at 41'. The closer the slope of 43 approaches that of 41', the smaller the difference between the slopes. Accordingly, the slope of 41" and 42" will be less, yielding more expansion. In FIG. 4 the slope of 43 has been made two-thirds that of 41', yielding a 3:1 expansion. Much greater expansions are possible. For example, if the slope of 43 differs from that of 41' by 1%, an expansion of 100 can be obtained.

As will be noted, the bandwidth $B_0$ of the output compression dispersive means 14 may be narrower than that of the input dispersive means 11, the ratio of the two bandwidths being approximately equal to the ratio of expansion. Thus the complexity and cost of 14 may be considerably less than 11.

If no amplification is employed, the amplitude of the output pulses will be less than that of the input pulses since the energy content cannot be greater. Thus, if losses are negligible, the amplitudes will decrease in the same ratio that the pulse lengths increase. However, amplification can be employed as described to preserve an adequate signal level.

For a given bandwidth $B_0$ of the output dispersive means 14, as the input pulses are separated more and more from that shown at 41, the output pulses will become longer and of smaller amplitude. This situation is shown in FIG. 5.

Figure 5:
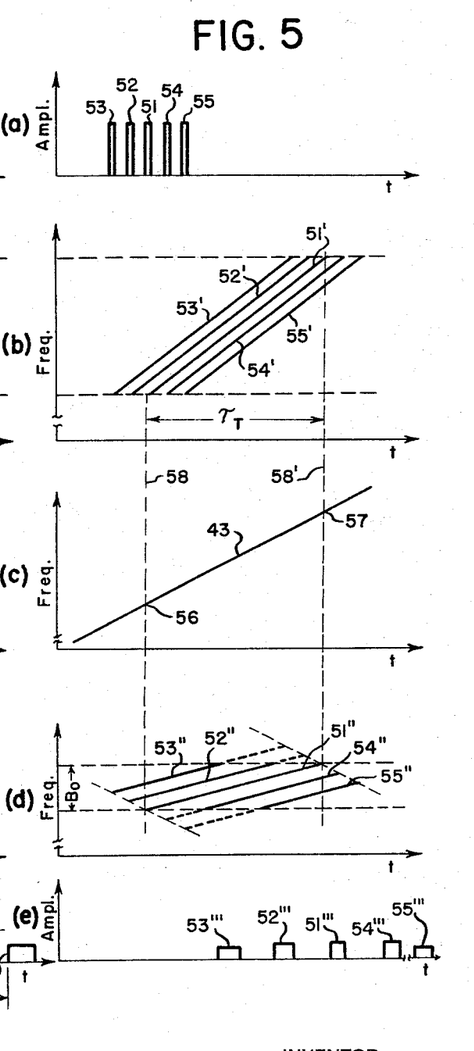

Referring to FIG. 5, input pulse 51 is assumed to give a resultant dispersed signal 51" from the mixer 12 which just lies within the bandwidth $B_0$ of the output dispersive means 14. Earlier pulses 52 and 53 yield corresponding dispersed signals 52" and 53". Later pulses 54 and 55 yield corresponding dispersed signal 54" and 55". Sweep 43 is assumed to be sufficiently long to encompass the time occurrences of dispersed signals 51'-55'.

The dotted portions of the mixer output dispersed signals in FIG. 5(d) are outside the assumed effective bandwidth $B_0$ of dispersive means 14, and accordingly do not take part in the reproduction of pulses in output line 15. Thus, some broadening and reduction in amplitude occur, as shown by corresponding output pulses 52''''-55''''.

It will be understood that the duration of sweep 43 can usually be considerably greater than $\tau_T$, provided it repeats in time for the next desired sampling interval. Also, the bandwidth of the compression dispersive means 14 can be made greater than $B_0$ if desired. In effect, this increases the sampling interval.

It will be appreciated that it is not possible to time-expand a continuous signal of indefinite duration in a single channel. At some point a portion of the input signal must be omitted if overlapping of corresponding portions of the output signal is to be avoided. Thus, if the expansion is in the ratio of 100:1, successive contiguous intervals in the output signal correspond to 1% of the intervals of the input signal with the intervening intervals lost. Additional channels may be employed to avoid such loss, as will be described later. At this point, however, it may be pointed out that the duration of the sampling intervals, and the frequency of recurrence thereof, may be controlled by proper selection of parameters.

In FIGS. 4 and 5, the interval designated $\tau_T$ represents approximately the duration of the sampling interval on the output time scale. The corersponding duration of the sampling period on the input time scale will be $\tau_T$ divided by the expansion ratio.

The sampling period is determined by the bandwidths and slopes of the dispersive devices and the frequency excursion and slope of the frequency sweep. Thus, the bandwith and slope of the frequency-time characteristics in the input dispersive means 11 will determine the time $\tau_T$ if the frequency sweep 43 and dispersive characteristic of the output means 14 are of adequate bandwidth. If the duration of sweep 43 ii less than $\tau_T$, or the bandwidth $B_0$ of the output dispersive means is inadequate, the sampling duration may be reduced. However, inasmuch as the bandwidth of the input dispersive means 11 is greater than that of the output, normally it will be the limiting factor.

Figure 6:
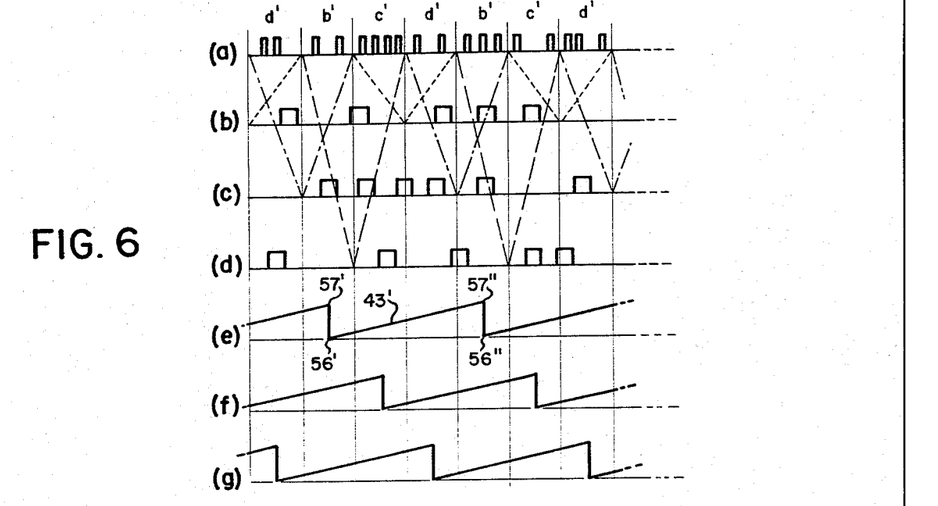
FIGS. 6(a) through 6(g) illustrates the time expansion of different portions of an input signal in different channels.

As is apparent from FIG. 4(b), the greater the slope of the dispersive characteristic of the input dispersive means, 11, will for a given bandwidth, the shorter the time $\tau_T$ and the shorter the sampling interval. By repeating frequency sweep 43 as soon as it has reached its upper limit, in sawtooth fashion, the sampling interval repeats. This is illustrated in FIG. 6.

FIG. 6(a) shows an input signal as composed of three sampling intervals $b'$, $c'$ and $d'$ which repeat at regular intervals. FIG. 6(b) shows the sampling intervals $b'$ expanded three times so that they are contiguous in the output line 15. The corresponding sawtooth variation for sweep 43 (FIG. 4) is shown at 43' in FIG. 6(e). Some degradation of the output signal may be present in such contiguous operation, as will be explained by reference back to FIG. 5. Assume that the sweep 43 has a lower limit at point 56 and an upper limit at point 57 and then rapidly retraces to start a new sweep at a frequency corresponding to point 56, as indicated by corresponding prime and double prime numbers in FIG. 6(e). The corresponding portions of the input dispersed signals 51'-55' which will beat with sweep 43 to form the output dispersed signals 51"-55" will lie between the dash lines 58, 58', Accordingly, the frequency ranges of dispersed signals 52"-55" will be reduced; while that of 51" will be the same as shown. While this may appear to be a serious reduction in output fidelity, FIG. 5 has been drawn for a relatively small expansion for purposes of convenience. The larger the expansion ratio, the less important this factor becomes. If it is not necessary for the output signal samples to be contiguous, a longer sweep 43 can be employed before it repeats.

In the drawings of this application, pulses are shown rectangular for convenience of drawing and comprehension. However, it will be understood by those skilled in the art that these pulses are idealized and that there will commonly be some rounding off due to the finite bandwidth of circuits through which they pass. The relative amplitudes and shapes of the output pulses depend somewhat on the exact shape of the input pulses.

Also, the duration of the sampling interval depends on the criteria employed to define it. Using a 3 db decrease in energy of the output pulses at the ends of the sampling interval as a criterion, and a bandwith $B_0$ of the output dispersive means 14 equal to the frequency dispersion range of a signal in the center of the sampling interval (as in FIG. 5(d) for 51″), the sampling interval closely approaches $\tau_T$ on the output time scale, for large expansion ratios. For smaller ratios, the sampling interval may be somewhat greater than $\tau_T$. If a greater decrease in pulse energy is used as a criterion, the sampling interval is correspondingly greater, but ordinarily would not exceed $2\tau_T$.

Figure 7:
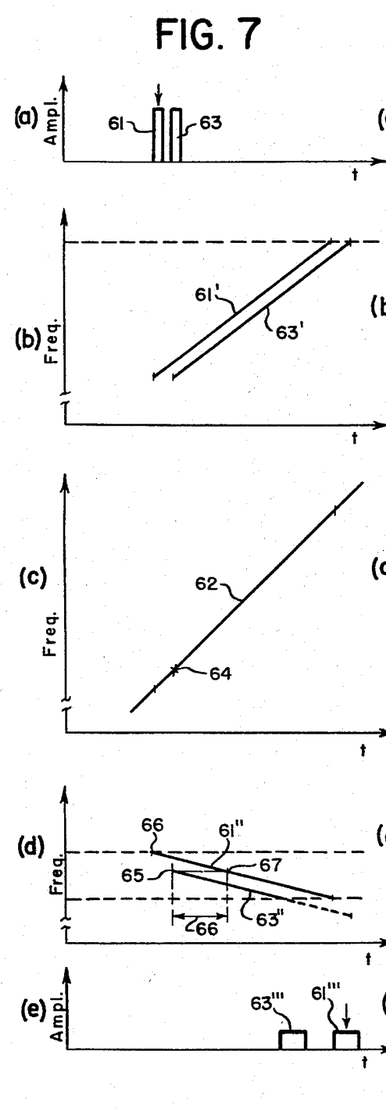
FIGS. 7(a) through 7(e) illustrates operation of FIG. 1 for time expansion with reversal of signal portions.

Referring to FIG. 7, a selection of parameters for FIG. 1 is shown which yields time expansion of input signals with time reversal within the sampling intervals. Input pulse 61 is dispersed in 11 to form an expanded signal 61′ as before. Sweep 62 from generator 13, however, has a slope which is greater than that of the dispersed signal 61′. Accordingly, the difference output of the mixer will be a dispersed signal 61″ having a negative slope. With the output dispersive means 14 of the type shown in FIG. 3(c), an output pulse 61‴ will be produced. This pulse will be expanded since the frequency range of 61″ is less than that of 61′.

The succeeding input pulse 63 produces a dispersed signal 63′ and, when mixed with frequency sweep 62, results in a dispersed signal 63″ which also has a negative slope. However, inasmuch as dispersed signal 63′ starts later than 61′, frequency sweep 62 will be at a higher frequency as indicated at 64. Accordingly, the difference signal 63″ will start at a frequency shown at 65 which is less than the initial frequency 66 of 61″, and occurs later. This results in the corresponding output pulse 63‴ occurring ahead of 61‴. This is the reverse of the input pulse sequence, as is readily apparent by noting the arrows marking corresponding input and output pulses 61, 61‴.

Explained in more detail, from FIG. 3(c) it will be apparent that the frequency represented by point 65 will not be delayed by the output dispersive means 14 as much as that corresponding to point 66. The actual time difference involved is shown by line 66 in FIG. 7(d), which is the time difference between like frequencies 65 and 67 of the two dispersed signals. Thus corresponding frequencies of dispersed signal 63″ will issue from dispersive means 14 before those of signal 61″.

As a result, assuming that sweep 62 repeats periodically for respective sampling intervals, successive sampling intervals in output line 15 will correspond to successive sampling intervals in input line 10, as previously explained in connection with FIG. 6. However, the output signal in each sampling interval will be time-reversed with respect to the input signal in that sampling interval.

Figure 8:
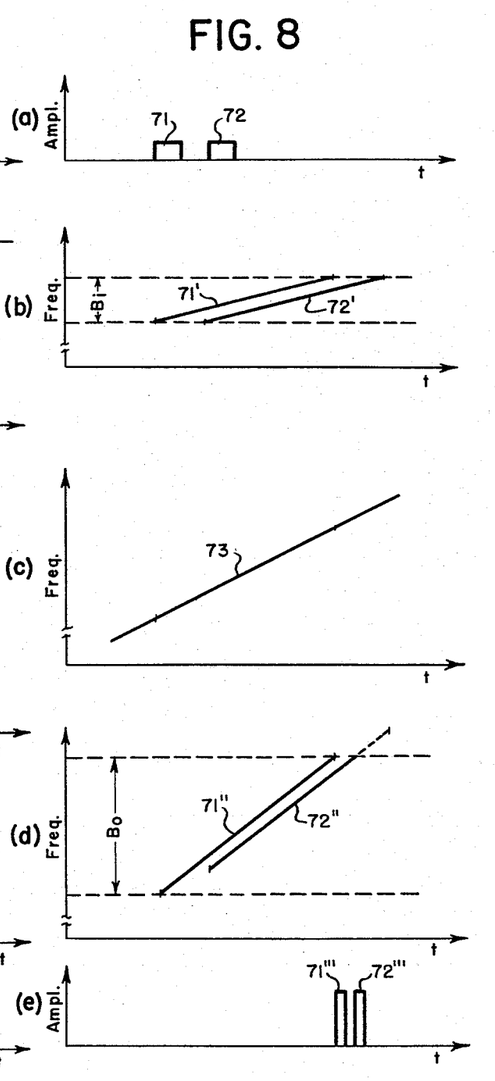
FIGS. 8(a) through 8(e) illustrates operation of FIG. 1 for time compression.

Referring now to FIG. 8, the selection of parameters in FIG. 1 to produce signal compression rather than expansion is illustrated. FIG. 8(a) shows a pair of pulses 71, 72 which are assumed to be present in input line 10. The pulses are longer than employed in previous figures, to facilitate comparison.

The pulses are dispersed in the input dispersive means 11 to form corresponding dispersed signals 71′, 72′. Since the pulses are broader, the bandwidth $B_1$ of the dispersive means 11 can be narrower. Dispersed signals 71′, 72′ are mixed with frequency sweep 73 from generator 13. In this example, the slope of sweep 73 is greater than the slope of the dispersed signals 71′, 72′, that is, greater than the slope of the dispersion characteristic in dispersive means 11. Also, in this example the sum output of mixer 12 is employed. Accordingly, the output of mixer 12 yields corresponding dispersed signals 71″, 72″ whose slopes are greater than the corresponding signals in FIG. 8(b). The characteristic of the output dispersive means 14 is as shown in FIG. 3(e), and the bandwidth $B_0$ thereof is made wide enough to accommodate the frequency excursion of 71″. Due to this wider bandwidth, the corresponding output pulses 71‴ and 72‴ will be narrower than the respective input pulses. The spacing of the output pulses will be reduced by the ratio of compression of pulse width, as developed by Equations 1 through 5, supra.

By increasing the slope of sweep 73 and correspondingly increasing the output bandwidth $B_o$, greater compressions can be obtained.

Figure 9:
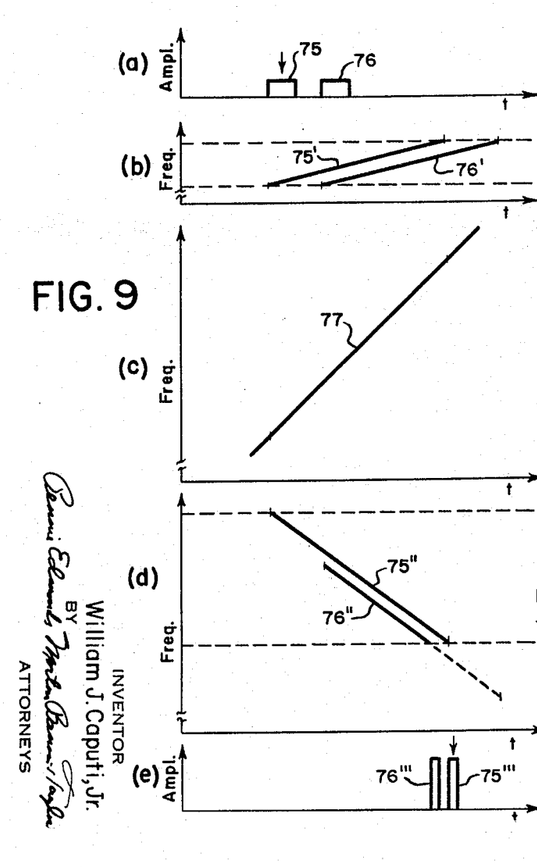
FIGS. 9(a) through 9(e) illustrates operation of FIG. 1 for time compression with reversal of signal components.

Referring now to FIG. 9, a selection of parameters for FIG. 1 is illustrated which produces signal compression, with time reversal within the sampling intervals. Here, input pulses 75, 76 are dispersed to form signals 75′, 76′, as in FIG. 8. However, sweep 77 from generator 13 has a greater slope and the difference output of mixer 12 is employed. Thus, when sweep 77 is subtracted from dispersed signal 75′, the resultant dispersed signal 75″ has a negative slope. By making the slope of sweep 77 sufficiently great, the frequency excursion of signal 75″ may be made substantially greater than that of 75′. Accordingly, with a dispersed characteristic of 14 as shown in FIG. 3(c), and a sufficiently wide bandwidth, a compressed output pulse 75‴ is produced.

Dispersed signal 76′ is similarly mixed with sweep 77 to yield a difference dispersed signal 76″. Since like frequencies to 76″ occur ahead of those of 75″, the corresponding output pulse 76‴ occurs ahead of 75‴.

In the foregoing specific examples, input dispersed signals of positive slope, and frequency sweeps of positive slope, have been shown. By changing the relative slopes, and by using sum or difference outputs of the mixer, the resultant dispersed signals from the mixer may have positive or negative slopes, and a frequency excursion greater or less than the corresponding input dispersed signals.

Figure 10:
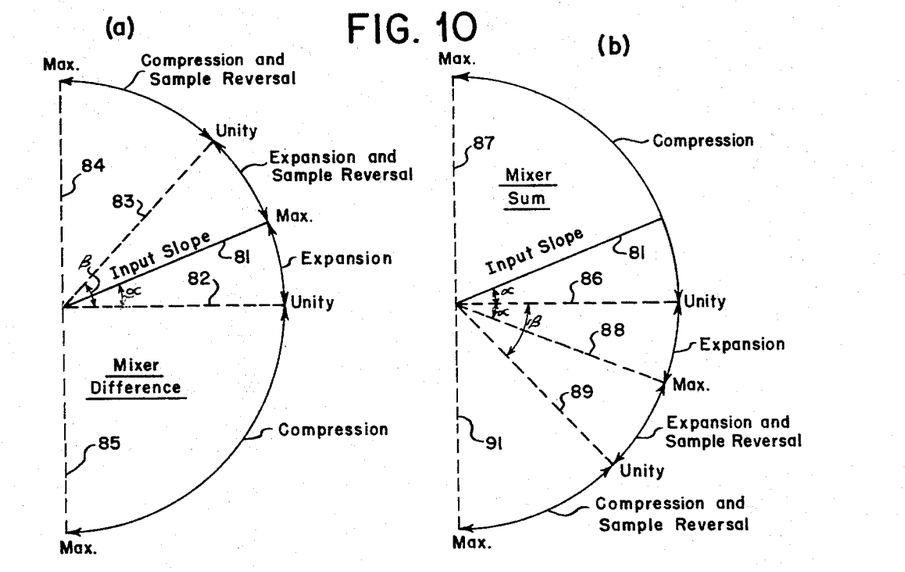
FIGS. 10(a) and 10(b) are diagrams illustrating various relationships of the parameters of FIG. 1 to give different types of operation.

FIG. 10 is a diagram illustrating in a more general way the selection of parameters to give the desired operation.

FIG. 10(a) applies to cases where the difference output of the mixer 12 is employed. The slope of the input dispersed signals from dispersive means 11 is shown at 81. If the slope of the frequency sweep from generator 13 lies between line 82 and line 81, expansion is obtained. Line 82 represents one limit where the sweep has zero slope, and hence there will be no expansion or compression. As the slope of the frequency sweep approaches that of 81, greater and greater expansions will be obtained, theoretically reaching infinite expansion at line 81. FIG. 4 is an example of this region of operation.

For slopes of the frequency sweep between line 81 and line 83, expansion with time reversal within the sample intervals will be obtained. FIG. 7 is an example of operation within this region. The expansion is maximum near line 81 and becomes unity at line 83 where the sweepslope is twice the input slope, that is $\tan\beta=2\tan\alpha$. The latter effect can be understood by reference to FIG. 7 where it will be seen that if frequency sweep 62 has twice the slope of the input dispersed signal 61′, the slope of the difference signal 61″ will be equal in magnitude and opposite in direction to 61′. Accordingly, there will be no expansion or compression, but there will be sample reversal.

Between lines 83 and 84, compression and sample reversal will be obtained. One such condition in this region is illustrated in FIG. 9.

It is also possible to reverse the direction of the frequency sweep from generator 13 so that it has a negative slope. In this case, operation wil lie between line 82 and 85, yielding compression. This may be understood by referring back to FIG. 8. If sweep 73 is negative rather than positive, and is subtracted from sweep 71′ rather than added thereto, the resultant output of the mixer will be as illustrated at 71″, yielding similar results.

FIG. 10(b) illustrates similar slope rleationships assuming that the mixer sum output is employed. Here again, line 81 represents the slope of the input dispersive characteristic. If the frequency sweep from generator 13 lies between lines 86 and 87, a compression of the output signal will be obtained. FIG. 8 is one example in this region.

If the frequency sweep lies between line 86 and 88, where the slope of line 88 is equal in magnitude to that of line 81, an expansion will be obtained. Thus, if in FIG. 4 sweep 43 had a small negative slope and were added to sweep 41', the resultant 41" would have a small positive slope as shown. As the negative slope of the sweep approached the magnitude of the slope of 41', the resultant 41" would have a very small slope corresponding to large expansion.

Between lines 88 and 89, where the slope of line 89 is twice that of line 81 in magnitude, expansion and time reversal within a sample interval can be obtained. Thus, if in FIG. 7 sweep 62 had a negative slope equal in magnitude to the positive slope of 61, and these signals were added, the resultant dispersed signal 61" would have zero slope corresponding to infinite expansion. With greater negative slopes of sweep 62, the expansion would become finite and reach unity when the negative slope of 62 is twice that of 61' in magnitude. Sample reversal will still be obtained since the output dispersed signals 61" and 63" would bear the same relationship shown in FIG. 7(d).

Between lines 89 and 91, compression and sample reversal will occur. Thus, if in FIG. 9 the sweep 77 were negative and more than twice the slope of 75' in magnitude, the sum of the two would yield a dispersed signal 75" of negative slope with a magnitude greater than that of 75'. Thus, the relationship would be similar to those shown in FIG. 9(d).

By comparing FIGS. 10(a) and 10(b), it will be seen that expansion without sample reversal can be obtained by using a frequency sweep whose slope, in magnitude, is not greater than the slope of the expansion dispersive means characteristic. Depending on the relative slope signs, the utilized sum or difference output of the mixer is that which gives a dispersion slope of the resultant dispersed signals substantially less in magnitude than that of the signals supplied to the mixer. For example reversal, the sweep slope is greater in magnitude than the dispersion slope of the signals to the mixer and, depending on the relative slope signs, the sum or difference output is selected to yield resultant dispersed signals in which like frequencies occur in reverse time sequence to like frequencies in the dispersed signals supplied to the mixer. If the sweep slope is between one and two times the dispersion slope of the signals to the mixer, expansion is obtained with sample reversal, and therebeyond compression is obtained with sample reversal. For compression without sample reversal, the sweep slope and sum or difference output of the mixer are selected to yield resultant output signals whose dispersion slope is greater than that of the input signals, and like frequencies in the input signals occur in the same time sequence in the output signals.

Figure 3:
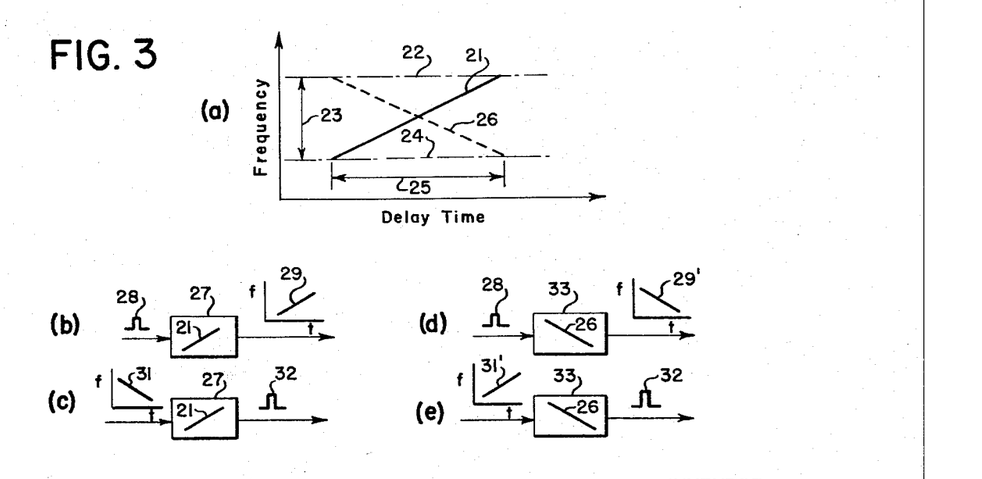
FIGS. 3(a) through 3(e) are diagrams that are explanatory of the operation of dispersive devices.

In the specific examples given herein, and in FIG. 10 the input dispersive means 11 is assumed to give dispersed signals with a positive slope. Thus, the functioning is as shown in FIG. 3 (b). If desired, the characteristic of the input dispersive means could have the opposite slope, functioning as shown in FIG. 3(d). The slopes of the sweep from generator 13 will then be inverted from those shown, in order to obtain equivalent results, and the characteristic of the output dispersive means 14 will have the opposite slope. From the above discussion of specific examples, and the explanation of FIG. 10, the manner in which the several slopes may be selected to give the desired results will be clear to those skilled in the art.

The input signal in line 10 may, in general, be a video, intermediate-frequency or radio-frequency signal. However, it is often difficult to design wide band dispersive devices for use at video frequencies. Also, the design and construction of dispersive devices of desired bandwidth and slope may be simpler in some frequency regions than in others. Accordingly, the frequency bands at various points in the arrangement shown in FIG. 1 may be shifted up or down in the frequency spectrum as meets the requirements of a particular application, or facilitates the design of components, etc. This may be accomplished by introducing heterodyne mixers at appropriate points, with a fixed local oscillator frequency applied thereto.

The amount of shifting of the signal band introduced in this manner will depend on the frequency of the fixed local oscillator, and also on whether the sum or difference output of the mixer is employed. These considerations are well-known to those skilled in the art.

An added factor should be taken into account when such shifting is employed. When a dispersed signal of given slope, or a frequency sweep of given slope, is applied to a mixer along with the fixed local oscillation, the output of the mixer may have the same slope as the input signal, or an opposite slope. Thus, if the local oscillator frequency is below the frequencies of the dispersed signal or the frequency sweep, both the sum and difference output signals of the mixer will have the same slope as the input signal. On the other hand, if the local oscillator frequency lies above that of the dispersed or sweep signal, the sum output will have the same slope but the difference output will have the reverse slope. Thus, in addition to shifting the frequency band up or down in the frequency spectrum, the slope of the signals may be inverted if desired. This is often useful to facilitate design of dispersive devices, or to enable available dispersive devices to be used.

In the specific embodiments described hereinbefore wherein the difference output of the mixer 12 is used, the frequency band of the sweep from generator 13 has been assumed to be below the frequency band of the dispersed signal from 11, so that the difference output of the mixer corresponds to subtracting the sweep from the dispersed signal. It is also possible to use a sweep whose frequency band is above the dispersed signal, provided proper account is taken of the change in slope of the output signal. For example, if in FIG. 4 the frequency band of sweep 43 were above that of dispersed signal 41', the difference output of the mixer would yield a dispersed signal 41" of the same frequency range shown but of opposite slope. Then the slope of the characteristic in dispersive means 14 could be inverted to obtain the same result, or the dispersed signal thereto inverted by heterodyning with a constant frequency local oscillation as just described.

Thus considerable flexibility in component design is possible by appropriate use of these factors.

For many applications it may be desired to select the sampling intervals with respect to the time occurrence of other events in the apparatus in which the invention is incorporated. This may be accomplished by suitable synchronization of the sweep frequency generator 13. Synchronization of such generators is well known in the art. For example, synchronizing pulses may be derived at an appropriate point in the apparatus and used to control the initiation of the sweeps in generator 13. If the input signals occur at spaced intervals, the onset of each signal portion may be used to trigger generator 13, with a suitable delay in the signal channel if required.

As will be noted from the drawings, for example FIG. 4, the pulses in the output line are delayed with respect to corresponding pulses in the input line. Inasmuch as the portion of the input signal which appears in the output line depends on the timing of the local sweep from generator 13, by appropriate control of this timing any desired portion of the input signal may be caused to appear in the output circuit after a suitable delay, and with expansion, compression, time reversal, etc. This may be of advantage in the processing of signals for particular purposes.

For many applications, conventional sweep frequency generators may be employed. However, in some instances it may be more convenient to use a dispersive device and apply pulses thereto to generate the frequency sweeps, as illustrated in FIGS. 3(b) and 3(d).

In the foregoing explanation of FIGS. 4, 5 and 7, wherein time expansion is produced, it has been pointed out that the input signal is sampled, and only those portions of the input signal occurring within the sampling intervals appear in the output of the channel. In order to obtain more complete expansion of the input signal, two or more channels like that shown in FIG. 1 may be employed. In such case, the input signal can be applied to all channels, and the frequency sweeps from generator 13 in the several channels delayed from channel to channel so that the sampling intervals of one channel are more or less filled in by the sampling intervals in other channels. However, inasmuch as the output of the input expansion dispersive means 11 is utilized only during the sampling intervals in a given channel, it may be used in common for the several channels. Illustrative embodiments are shown in FIGS. 11 and 12.

Figure 11:
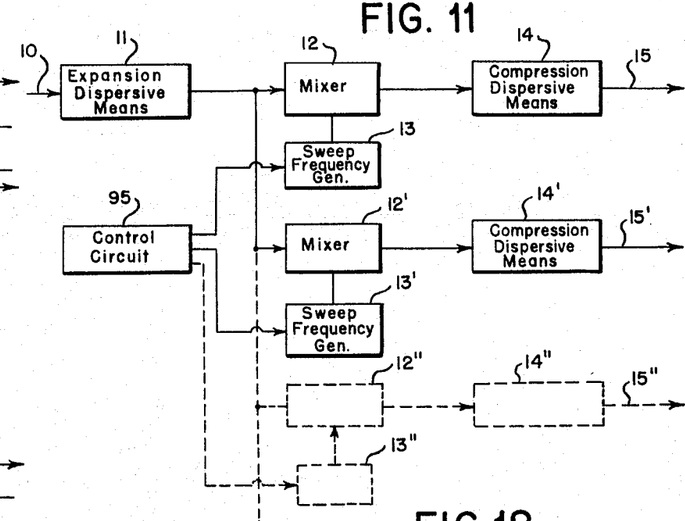
FIG. 11 shows an embodiment containing several channels for reproducing different portions of the input signal.
Figure 12:
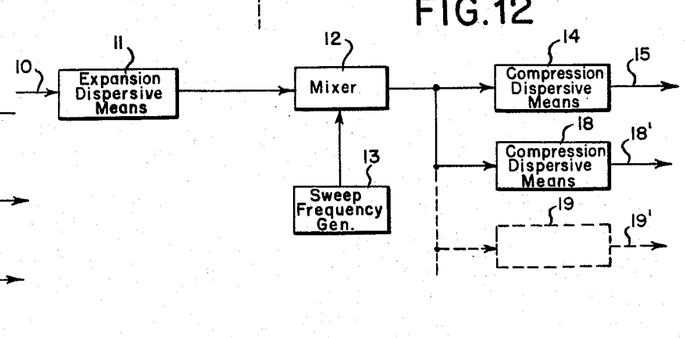
FIG. 12 is a modified multi-channel embodiment.

Referring to FIG. 11, the output of expansion dispersive means 11 is supplied to a plurality of mixers 12, 12', 12", etc. The outputs of the mixers are supplied to respective compression dispersive means 14, 14', 14", etc., all of which may be identical. The mixers are supplied with similar frequency sweeps which are delayed from channel to channel. As specifically shown, a plurality of generators 13, 13', 13", etc. are employed, and the sweeps are initiated in succession under the control of a control circuit 95. Thus, different portions of the dispersed input signal appear in the mixer outputs.

The operation may be understood by reference to FIG. 5. As there shown, with a given frequency sweep 43, a given portion of the input signal in FIG. 5(a) appears at the output of mixer 12, as shown in FIG. 5(d). With a bandwidth $B_0$ for the output compression dispersive means 14, only dispersed signals lying within this bandwidth produce output pulses in line 15, as shown in FIG. 5(e). Thus input pulses preceding pulse 53 and following pulse 55 will not produce output pulses for the particular sweep 43 shown.

If another frequency sweep like 43 but delayed by an interval $\tau_T$ is produced, portions of the input signal within the next sampling interval would appear in the output line. Thus, if in FIG. 11 the sweeps from generators 13, 13', etc. are delayed by $\tau_T$, portions of the input signal in line 10 occurring in adjacent sampling intervals will appear in output lines 15, 15', 15", etc. If desired, of course, a greater delay in the frequency sweeps can be employed so that the sampling intervals are non-contiguous.

FIG. 6 illustrates this operation for three channels and tripple expansion. Input signal portions $b'$ appear in output line 15 as shown at $(b)$, the sweep from generator 13 being shown at $(e.)$ Portions $c'$ appear in output line 15' as shown at $(c)$, with the sweep shown at $(f)$. Portions $d'$ appear in output line 15" as shown at $(d)$, with the sweep shown at $(g)$.

Instead of using separate sweep generators 13, 13', etc., as specifically shown in FIG. 11, a single sweep generator could be employed and heterodyned with appropriate fixed frequencies in a plurality of mixers to frequency shift the sweep up or down in the manner described above. By appropriately selecting the shifts and sweep duration, frequency sweeps may be obtained which, when applied to respective mixers 12, 12', 12", etc., will give the proper outputs for the compression dispersive means 14, 14', 14", etc.

An alternative way of increasing the input signal coverage is shown in FIG. 12. Here a single mixer is employed and the sweep from sweep frequency generator 13 is assumed to be much longer than that required for a single channel. Then, a plurality of output compression dispersive means 14, 18, 19, etc. are connected to receive the output of mixer 12. These compression dispersive means are designed to have their reception bandwidths in different portions of the frequency spectrum. For adjacent sampling intervals of the input signal, their bandwiths will lie adjacent to one another.

The operation of FIG. 12 may be understood by reference back to FIG. 5. As is there apparent, the mixer output signals 51"–55" gradually move outside the bandwidth denoted $B_0$. If sweep 43 in FIG. 5(c) is lengthened while maintaining the same slope, input signals preceding and following those shown in FIG. 5(a) will appear partly or wholly outside of the bandwidth $B_0$ of FIG. 5(d). If the bandwidths of the output compression dispersive means 18 and 19 lie above and below that shown in FIG. 5(d), expanded signals corresponding to preceding succeeding portions of the input signal will appear in output lines 18' and 19' of FIG. 12, respectively.

A combination of the operations of FIGS. 11 and 12 may be utilized, if desired. Thus, a few adjacent sampling intervals may be expanded as shown in FIG. 12 by using a single frequency sweep and adjacent band output dispersive means, then the next few adjacent portions of the input signal expanded by using a similar arrangement with the frequency sweep delayed as explained in connection with FIG. 11, etc.

The specific embodiments particularly shown applications using electrical signal inputs and outputs. As has been stated, the frequencies involved may extend over a wide range, and applications in the microwave region are particularly contemplated. Within its broader scope, however, the invention is applicable to signal waves in general, so long as dispersive devices or dispersive mediums are available for the partcular type of sgnal waves employed. Thus the invention may be applied in the optical and acoustic fields, the latter including both sonic and ultrasonic frequencies. In such case the mixer will be a device, suitable for the particular type of waves employed, which will give sum or difference frequency outputs from the dispersed signal and frequency sweep applied thereto.

Linear dispersion characteristics and frequency sweeps have been particularly described and are usually preferable. However, linearity may be departed from in particular applications.

In many applications the dispersive means, mixer, etc. of FIG. 1 will be in one location and interconnected by transmission lines or links suitable for the frequencies and types of waves involved. However, within the broad scope of the invention, various parts of the system may be in different locations, and interconnected by transmissions through space. For example, radio, optical or sonic links, etc. may be employed. If the transmission medium is dispersive, the dispersion characteristic thereof may be used for expansion and/or compression, supplemented is necessary by additional dispersive means.

The invention has been described in connection with specific embodiments thereof. It will be understood that many modifications may be made therein, within the spirit and scope of the invention.

I claim:
1. Signal translation apparatus comprising,
 means for producing a dispersed signal having a plurality of different frequency components that are progressively delayed as a function of frequency thereby to impart a sloping frequency-time characteristic to said dispersed signal,
 means for producing a sweep frequency signal having a frequency-time characteristic whose slope is different from that of said dispersed signal,
 mixing means for mixing said expanded dispersed signal and said sweep frequency signal to produce a resultant dispersed signal whose frequency-time characteristic has a finite desired slope relative to that of said dispersed signal,
 compression dispersive means having a frequency-time characteristic whose slope is substantially equal and opposite to that of said resultant dispersed signal for compressing the time period of occurrence of frequency components of said resultant dispersed signal.

2. Signal translation apparatus for receiving an input signal comprised of a plurality of different coexistent frequency components which occur in a first time period and capable of producing an output signal having different characteristics comprising the combination,
    expansion dispersive means for progressively delaying as a function of frequency the frequency components of said input signal to produce a time expanded signal in which the delayed frequency components occur within a second time period longer than said first time period,
    means for producing a sweep frequency signal having a frequency-time characteristic whose slope is different from that of said time expanded signal,
    mixing means for mixing said time expanded signal and said sweep frequency signal to produce a resultant dispersed signal whose frequency-time characteristic has a finite desired slope relative to that of said time expanded signal,
    compression dispersive means having a frequency-time characteristic whose slope is substantially equal and opposite to that of said resultant dispersed signal for compressing the time period of occurrence of frequency components of said resultant dispersed signal.

3. In a signal translation system adapted to receive a dispersed signal and to translate said dispersed signal, wherein said dispersed signal includes a plurality of different frequency components that are delayed in time by different amounts as a function of their frequency, thereby to impart a given frequency-time slope characteristic to said dispersed signal, the combination comprising,
    means for producing a sweep frequency signal having a frequency-time characteristic whose slope is different from that of said dispersed signal,
    mixing means for mixing said time expanded signal and said dispersed signal to produce a resultant dispersed signal whose frequency-time characteristic has a finite desired slope relative to that of said dispersed signal,
    compression dispersive means having a frequency-time characteristic whose slope is substantially equal and opposite to that of said resultant dispersed signal for compressing the time period of occurrence of frequency components of said resultant dispersed signal.

4. Apparatus responsive to a plurality of sequentially occurring input signals each having a plurality of substantially coexisting different frequency components and capable of changing in a given manner the duration of each of said signals and of changing in like manner the time intervals between the occurrences of said signals comprising,
    expansion dispersive means for progressively delaying as a function of frequency the frequency components of each of said input signals,
    means for producing a frequency sweep whose frequency-time characteristic has a slope that is different from those of output signals from said expansion dispersive means,
    means for mixing said frequency sweep with the output signals of said expansion dispersive means to produce resultant dispersed signals whose frequency-time characteristics have a finite desired slope relative to those of the output signals of said expansion dispersive means and,
    compression dispersive means having a frequency-time characteristic whose slope is substantially equal and opposite to those of the resultant dispersed signals to compress in time as a function of frequency the frequency components of said resultant dispersed signals thereby to produce a plurality of sequentially occurring output signals whose durations bear a desired relationship to those of corresponding input signals and wherein the time intervals between the occurrences of said output signals bear a like relationship to those between corresponding input signals.

5. The combination claimed in claim 4 wherein said resultant dispersed signals are difference frequency output signals from said mixing means and the slope of the frequency-time characteristic of said frequency sweep is of the same sense as those of the output signals of said expansion dispersive means.

6. The combination claimed in claim 5 wherein the magnitude of the slope of said frequency sweep is less than those of the output signals of said expansion dispersive means, whereby the output signals of said compression dispersive means and the time intervals therebetween are expanded in time and occur in the same sequence relative to corresponding ones of said input signals.

7. The combination claimed in claim 5 wherein the magnitude of the slope of said frequency sweep is greater than one time and less than two times those of the output signals of said expansion dispersive means, whereby the output signals of said compression dispersive means and the time intervals therebetween are expanded in time and occur in reverse sequence relative to corresponding ones of said input signals.

8. The combination claimed in claim 5 wherein the magnitude of the slope of said frequency sweep is greater than twice those of the output signals of said expansion dispersive means, whereby the output signals of said compression dispersive means and the time intervals therebetween are compressed in time and occur in reverse sequence relative to corresponding ones of said input signals.

9. The combination claimed in claim 5 wherein the magnitude of the slope of said frequency sweep is substantially twice those of the output signals of said expansion dispersive means, whereby the output signals of said compression dispersive means and the time intervals therebetween are of substantially the same duration as corresponding ones of said input signals and the output signals occur in reverse sequence relative to said input signals.

10. The combination claimed in claim 4 wherein said resultant dispersed signals are difference frequency output signals of said mixing means and wherein the slope of said frequency sweep is of opposite sense relative to those of the output signals of said expansion dispersive means, whereby the output signals of said compression dispersive means and the time interval therebetween are compressed in time and occur in the same sequence relative to corresponding ones of said input signals.

11. The combination claimed in claim 4 wherein said resultant dispersed signals are sum frequency output signals from said mixing means and the slope of the frequency-time characteristic of said frequency sweep is of opposite sense relative to those of the output signals of said expansion dispersive means.

12. The combination claimed in claim 11 wherein the magnitude of the slope of said frequency sweep is less than those of the output signals of said expansion dispersive means, whereby the output signals of said compression dispersive means and the time intervals therebetween are expanded in time and occur in the same sequence relative to corresponding ones of said input signals.

13. The combination claimed in claim 11 wherein the magnitude of the slope of said frequency sweep is greater than one times and less than two times those of the output signals of said expansion dispersive means, whereby the output signals of said compression dispersive means and the time intervals therebetween are expanded in time and occur in reverse sequence relative to corresponding ones of said input signals.

14. The combination claimed in claim 11 wherein the magnitude of the slope of said frequency sweep is greater than twice those of the output signals of said expansion dispersive means, whereby the output signals of said compression dispersive means, and the time intervals therebetween are compressed in time and occur in reverse sequence relative to corresponding ones of said input signals.

15. The combination claimed in claim 11 wherein the magnitude of the slope of said frequency sweep is substantially twice those of the output signals of said expansion dispersive means, whereby the output signals of said compression dispersive means are of substantially the same duration and occur in reverse sequence relative to corresponding ones of said input signals.

16. The combination claimed in claim 4 wherein said resultant dispersed signals are the sum output signals of said mixer means and wherein the slope of said frequency sweep is of the same sense as those of the output signals of said expansion dispersive means, whereby the output signals of said compression dispersive means and the time intervals therebetween are compressed in time and occur in the same sequence relative to corresponding ones of said input signals.

17. Apparatus for receiving an input signal of given duration and comprised of a plurality of substantially coexisting different frequency components, and for changing the time duration of said signal with an accompanying reciprocal change in bandwidth of frequency components of the changed signal comprising, expansion dispersive means having a bandwidth $B_i$ for progressively delaying as a function of frequency the different frequency components of said input signal, means for producing a frequency sweep signal whose change in frequency per unit time is different from that of the output signal from said expansion dispersive means, means responsive to the output signal of said expansion dispersive means and to said frequency sweep for producing a resultant dispersed signal whose change of frequency per unit time is a value greater than zero and different from that of the output signal of said expansion dispersive means, compressive dispersive means having a bandwidth $B_o$ different from the frequency change of the frequency sweep signal and having a dispersive characteristic substantially equal and opposite to the change of frequency per unit time of the resultant dispersed signal, said compressive dispersive means being responsive to said resultant dispersed signal to produce an output signal whose duration differs in a given manner from that of said input signal and whose bandwidth differs in an inverse manner from that of said input signal.

18. The combination claimed in claim 17 wherein, said resultant dispersed signal is the difference frequency output signal of a mixer means and the change in frequency per unit time of said frequency sweep signal is of the same sense and less than twice the magnitude of the change in frequency per unit time of the output signal of said expansion dispersive means, and wherein the bandwidth $B_o$ of the compression dispersive means is less than the bandwidth $B_i$ of the expansion dispersive means, whereby the output signal of said compression dispersive means is longer in duration and contains fewer frequency components than said input signal.

19. The combination claimed in claim 17 wherein, said resultant dispersed signal is the sum frequency output signal of a mixer means and the change in frequency per unit time of said frequency sweep signal is of opposite sense and less than twice the magnitude of the change in frequency per unit time of the output signal of said expansion dispersive means, and wherein the bandwidth $B_o$ of the compression dispersive means is less than the bandwidth $B_i$ of the expansion dispersive means, whereby the output signal of said compression dispersive means is longer in duration and contains fewer frquency components than said input signal.

References Cited by the Examiner

UNITED STATES PATENTS

| 1,671,143 | 5/1928 | Campbell | 179—15.55 |
| 1,773,126 | 8/1930 | Affel | 179—15.55 |
| 1,821,997 | 9/1931 | Wintringhon | 179—15.55 |
| 3,026,475 | 3/1962 | Applebaum | 179—1 |

References Cited by the Applicant

UNITED STATES PATENTS

| 2,882,395 | 4/1959 | White. |
| 2,954,465 | 9/1960 | White. |

DAVID G. REDINBAUGH, *Primary Examiner.*

J. T. STRATMAN, *Assistant Examiner.*